Jan. 9, 1962  C. BANCROFT  3,015,967
AUTOMATIC TRANSMISSION
Filed Feb. 8, 1956  3 Sheets-Sheet 1

INVENTOR.
CHARLES BANCROFT
BY
ATTORNEYS

Jan. 9, 1962  C. BANCROFT  3,015,967
AUTOMATIC TRANSMISSION
Filed Feb. 8, 1956  3 Sheets-Sheet 2

INVENTOR.
CHARLES BANCROFT
BY
Kenyon & Kenyon
ATTORNEYS

Jan. 9, 1962 C. BANCROFT 3,015,967
AUTOMATIC TRANSMISSION
Filed Feb. 8, 1956 3 Sheets-Sheet 3

INVENTOR.
CHARLES BANCROFT
BY
Kenyon & Kenyon
ATTORNEYS

United States Patent Office 3,015,967
Patented Jan. 9, 1962

3,015,967
AUTOMATIC TRANSMISSION
Charles Bancroft, Ferris Hill Road, New Canaan, Conn.
Filed Feb. 8, 1956, Ser. No. 564,262
1 Claim. (Cl. 74—394)

This invention relates to an automatic transmission, for rotary power, which provides a coupling having a continuously variable torque and speed ratio from 1 to 0 to 1 to 1 between the driving or input element and the driven or output element.

One of the objects is to provide for automobiles, locomotives, tractors, power shovels, and the like, a power transmission means between the power source and the driven element, which is reasonably efficient at any ratio within its operating range. Another object is to provide an automatic transmission which automatically varies its ratio in response to variations in load so that the transmission can be designed to provide for any particular installation the maximum torque attainable for any output speed or the maximum output speed attainable for any load at a given throttle setting.

Still another object is to provide a transmission which provides low output torque at very low input speeds, such as the idling speed of an internal combustion engine, and thus permits the elimination of the usual clutch. Other objects are to provide a transmission which may be reversed, so as to reverse a vehicle for example, while retaining its automatic ratio varying characteristic.

Figure 1:
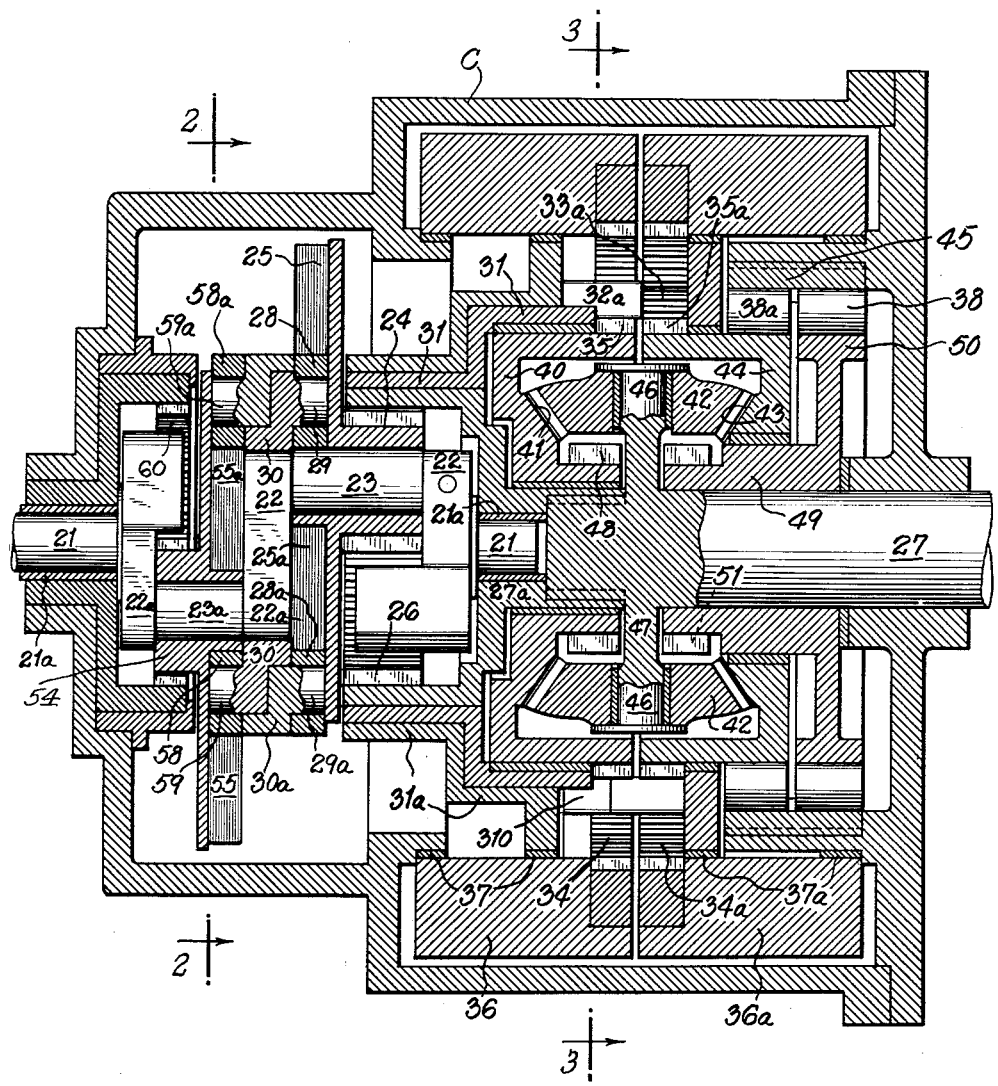
Figure 2:
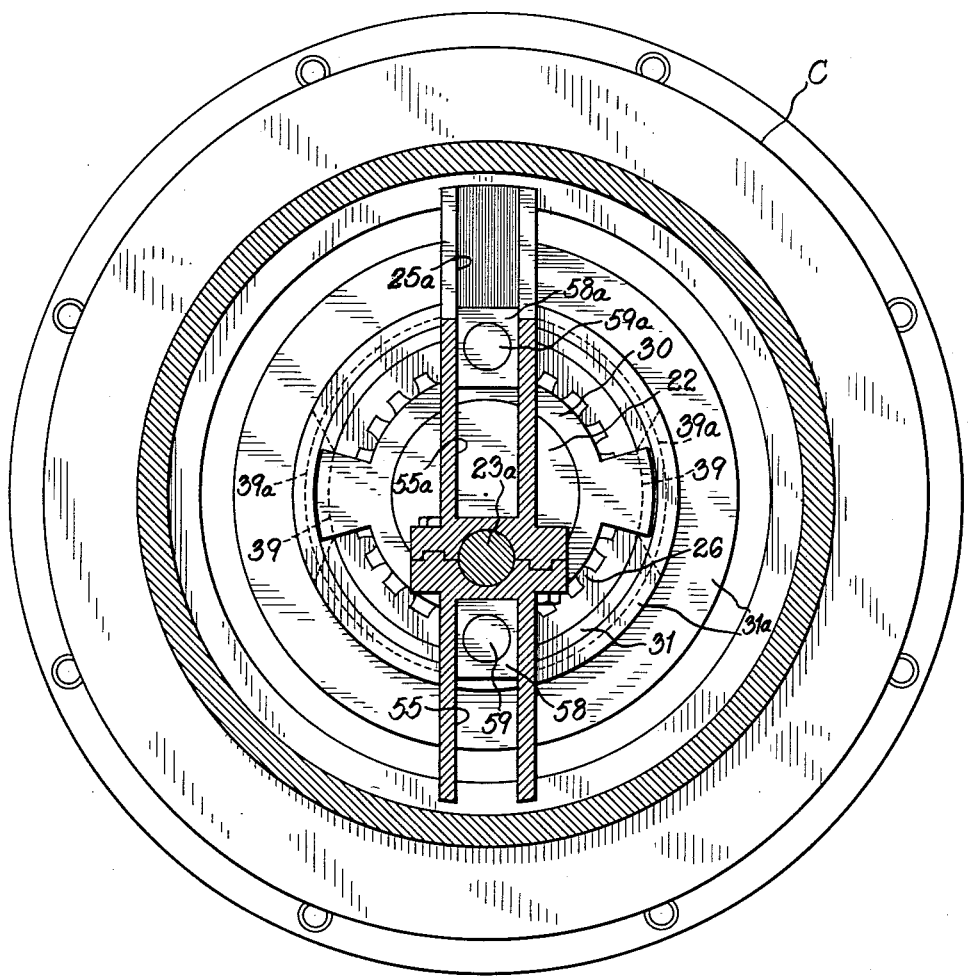
Figure 3:
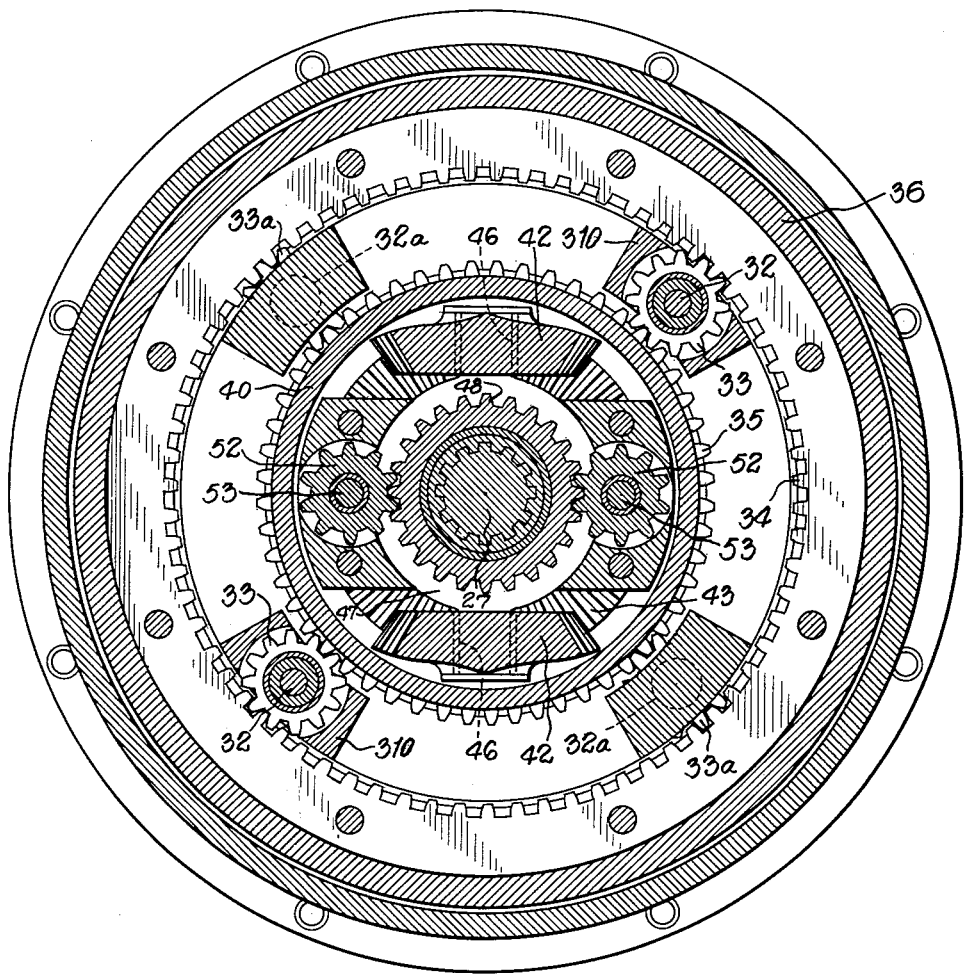

The principles of the present invention are illustrated by the accompanying drawings in which:

FIG. 1 is a longitudinal section of the device;
FIG. 2 is a cross section taken on the line 2—2 in FIG. 1; and
FIG. 3 is a cross section taken on the line 3—3 in FIG. 1.

These figures depict a device wherein two flywheels are used so as to smooth the action of the transmission.

The input shaft 21 has a crank arm 22, formed by interspaced parts, and a crankpin 23 located between these parts. A pinion 24 is journaled on the pin 23 for free rotation with respect thereto and this pinion 24 is connected with a guideway 25 which is fixed to and rotates with the pinion 24.

The pinion 24 meshes with an internal ring gear 26 which is connected with an output shaft 27. The manner in which this connection is made will be explained hereinafter. A cross head 28 slides in the guideway 25 radially with respect to the crankpin 23 and this cross head journals the crankpin 29 of a crank 30. The crank arm 22 is formed by two disk parts which are concentric overall with respect to the shaft 21, and the crank arm 30 encircles and is journaled on the edge of the front one of these disks 22, with its pin 29 radially offset from this disk. It is to be understood that the input shaft 21, the crank arm parts 22 and the crankpin 23 are all part of a crankshaft with all parts turning together. The crankshaft 21 extends to both sides of the two-part crank arm 22, so that the crankshaft may be journaled at the two points 21a and be supported rigidly.

A hollow shaft 31 encircles the shaft 21, over an interposed hollow shaft described later, and is free to rotate with respect to this shaft 21.

This hollow shaft 31 has radially outwardly extending flange sections or bearing mounts 31a which mount shafts 32, shown in FIG. 3, on which planetary gears 33 are journaled. These planetary gears 33 are part of a differential gearing system formed by these gears 33 meshing with an outer ring gear 34 and an inner spur gear 35.

The outer ring gear 34 connects directly with a flywheel 36. This flywheel is journaled on a bearing 37 by the casing C of the transmission and on the hollow shaft 31.

In operation, considering the action of one flywheel 36, it is seen that when output shaft 27 is connected with a load, it begins to rotate when the cross head 28 just begins to slide outwardly to a location where adequate lever ratio is obtained, after which the flywheel 36 accelerates; also deceleration of the flywheel 36 provides a rotative force which is transmitted to output shaft 27 when the cross head 28 slides inwardly to the location providing this adequate lever ratio. This action, of course, occurs with great rapidity and successively so that the driving effect is in the form of a multiplicity of impulses. It can be seen, too, that an oscillatory action is imparted to the shafts 32 on which the differential gearing planet gears 33 are mounted. As previously indicated, two flywheels are used, however, and to obtain a compact construction the one-way brake arrangement is made to work with both flywheels.

The second variable ratio differential system, required for the second flywheel, is provided, in this instance, by a second guideway 25a which also extends radially from the pinion 24 but diametrically opposite to the guideway 25. A cross head 28a slides radially in this guideway 25a and journals the crankpin 29a of a crank arm 30a, which is journaled on the crank 30 and is otherwise somewhat similar thereto. The crank 30a has a hollow shaft 31a which encircles the crankshaft 21 and is free to rotate relative thereto and with respect to the other hollow shaft 31, the latter two parts being superimposed. This hollow shaft 31a is connected with radially located shafts 32a on which the planetary gears 33a are journaled.

As in the other instance, the planetary gears 33a mesh with an outer ring gear 34a and an inner spur gear 35a. The gear 34a is fixed to the second flywheel 36a which is journaled by a bearing 37a inside of the casing C and on the end of the shaft 31a.

Both of the hollow shafts 31 and 31a have cut-outs or openings to provide clearance for the guideways 25 and 25a. Such openings are shown by the dotted lines in FIG. 2 which define the solid portions 39 and 39a circumferentially between the openings, these portions partially overlapping.

Each of the gears 35 and 35a shares the same set of one-way brakes 38 and 38a. The gear 35 connects without motion reversal with the one-way brake 38a and through a motion reversing gearing with the one-way brake 38, both of these one-way brakes locking against backward motion. The gear 35a connects directly with the one-way brake 38a and through the motion reversing gearing with the one-way brake 38. In this way the same set of one-way brakes 38 and 38a effectively serve both of the flywheels 36 and 36a.

The motion reversing gearing is arranged so that during deceleration of either of the flywheels the force stored in the flywheel is transmitted to the output shaft 27.

The planetary gearing and connections are provided by making the gear 35 part of a rotative hollow form 40 forming an internal bevel gear 41 with which the necessary planet gears 42 mesh, these gears 42 in turn meshing with an internal bevel gear 43 formed by a part 44, similar to the part 40, and to which the gear 35a connects directly. The one-way brake 38a is mounted on the part 44 so as to work against a cooperating surface 45 anchored with respect to the casing C. The planet pinions 42 are journaled on shafts 46 which are radially mounted by a flange 47 extending radially from and fixed to the output shaft 27.

The above provides a compact planetary gearing system but makes it necessary to transmit rotative motion from the part 40 to the one-way brake 38. Therefore, the part 40 has a hub or hollow gear portion 48, as mentioned earlier, which is journaled on the hollow crankshaft extension 27a providing the mounting for the gear 26 and connecting the latter with the output shaft 27. The parts 27 and 27a are keyed together. The part 44 is journaled on a hollow shaft 49 which is, in its turn, journaled on the shaft 27. This shaft 49 mounts the drum 50 for the one-way brake 38 which works against the anchore dpart 45 previously described. This hollow shaft 49 provides an external gear 51 of the same diameter as the gear 48. These gears 48 and 51 are made to turn synchronously in a positive manner by small pinions 52, shown in FIG. 3. These pinions 52 project through holes 54 formed in the flange 47 and the pinions are wide enough to engage both the gears 48 and 51 simultaneously. The pinions have shaft extensions 53 which are suitably mounted by overhanging bearings secured to the flange 47.

It can be seen that in the variable ratio differential gear mechanisms as described so far, the stress distribution is not balanced and, therefore, the hollow crank members and their associated hollow shafts receive twisting stresses which both stress the parts and load their bearing members unevenly. However, members are included for balancing the stresses so as to avoid distortion and loading of their bearings.

With the above in mind, the crankshaft 21 is provided with a second crank arm 22a which, like the crank 22, is formed by two members or split arms between which is located a crankpin 23a forming in effect a companion to the crankpin 23 but located 180° out of phase therewith. The throw of the crank arm 22a is the same as that of the crank arm 22 and the rear arm part is formed by the front part of the arm 22.

Now, as shown by FIG. 2, the crankpin 23a has journaled to it radial guideways 55 and 55a which are in effect companions to the guideways 25 and 25a. The crank 30 has a crankpin 59 which is diametrically opposite to its crankpin 29 and is journaled in a cross head 58 which is a companion to the cross head 28. The crank 30a has a crankpin 59a which is a companion to its crankpin 29a and is located diametrically opposite thereto. This crankpin 59a has a cross head 58a riding in the guideway 55a.

With this arrangement the crankpins 59 and 59a rotatively couple the radial guideways, shown as forming a part integral with a pinion 24, to guideways 25 and 25a, as also do pins 59 and 29, thereby causing both these rotary members to rotate together on their different axes and thus equallizing stresses between all parts. Therefore, stresses in one direction on each of the hollow shafts 31 and 31a appear on the opposite side of these members in the opposite direction.

In the operation of this device the parts operate so as to impart rapid and successive impulses from the flywheels to the output shaft, the impulses from the respective flywheels being out of phase with each other. When the flywheel 36 is accelerated backwards the reaction to the casing C is carried by the one-way brake 38 through the drum 50, the parts 48 and 49, through the pinions 52, and the gear 35 with which the planetary pinions 33 are meshed. The ring gear 34 which engages these planet gears is, of course, fixed to the flywheel 36.

When the flywheel 36 decelerates the motion carries back through the parts to the bevel gear 41 and through the planet gears 42, which reverse the motion, to the bevel gear 43 and thus to the one-way brake 38a. Due to the reversal of motion a forward thrust is thus applied to the output shaft 27. This action occurs because in reversing the motion the planet gears 42 apply a forward thrust to the radial shafts 46 which connect with the output shaft 27. The same kind of action prevails in the case of the flywheels 36a excepting that during backward acceleration of the flywheel 36a the reaction goes through the drum 44 directly to the one-way brake 38a. It is during the deceleration that the planet gears 42 come into play to reverse the motion and send the reaction through the members 48 and 49 to the drum 50 of the one-way brake 38.

To facilitate locking the output shaft against backward rotation a second ring gear 60 is provided which meshes with a spur gear 54 provided on the member carrying the guides 55 and 55a which, therefore, causes this ring gear 60 to be rotatively coupled to the ring gear 26 and the output shaft 27 so that by locking the ring gear 60 it locks the output shaft. This ring gear 60 may be journaled with respect to the casing and this gear 60 may project forwardly through the casing so it may be locked against rotation by a suitable means. This permits the casing to be unlocked so that the reverse rotation may be taken from the casing. This second ring gear 60 also provides a convenient method of coupling to an output two units of the double flywheel type so that a plurality of units may be incorporated in a device of this kind, according to the smoothness desired.

It is to be understood that any suitable type of one-way brake design may be used. This may be of the tooth and dog type, friction-wedge or ball type, etc. The brakes work continuously and should be designed with heavy-duty service in mind.

I claim:

A differential gearing of cyclical varying gear ratio, including an input shaft having diametrically extending crank arms each having a crankpin, a pinion journaled on one of said pins, a ring gear meshed with said pinion and arranged to revolve said pinion when said shaft turns, a set of guideways connected to said pinion and diametrically extending radially therefrom, a set of guideways journaled on the other of said pins and diametrically extending radially therefrom, a crankshaft having diametrically extending crank arms and pins with the latter engaged by and radially guided by one of said guideways of each of said sets, and a second crankshaft having diametrically extending crank arms and pins with the latter engaged by and radially guided by the other of said guideways of each of said sets.

References Cited in the file of this patent
UNITED STATES PATENTS

| | | |
|---|---|---|
| 1,810,282 | Ljungstrom | June 16, 1931 |
| 2,598,164 | Hammil | May 27, 1952 |

FOREIGN PATENTS

| | | |
|---|---|---|
| 589,423 | France | Feb. 20, 1925 |